US005471539A

United States Patent [19]

Flum et al.

[11] Patent Number: 5,471,539

[45] Date of Patent: Nov. 28, 1995

[54] EDIT SELECT SWITCH FOR MONITOR SOURCE SELECT

[75] Inventors: Alan Flum, Tamarac; Michael A. Zampini, Boca Raton, both of Fla.; Masahiro Fujita, Yokohama, Japan

[73] Assignee: Sony Electronics Inc., Park Ridge, N.J.

[21] Appl. No.: 40,594

[22] Filed: Mar. 31, 1993

[51] Int. Cl.[6] .......... H04B 1/00

[52] U.S. Cl. .......... 351/119; 351/123

[58] Field of Search .......... 381/119, 123

[56] References Cited

U.S. PATENT DOCUMENTS

| | | | |
|---|---|---|---|
| 4,635,288 | 1/1987 | Stadius | 381/119 |
| 4,879,751 | 11/1989 | Franks et al. | 381/119 |

FOREIGN PATENT DOCUMENTS

| | | |
|---|---|---|
| 2255696A | 11/1992 | United Kingdom . |

OTHER PUBLICATIONS

MXP–290 Series Mixer Manual, pp. 1–8(E) to 1–9(E) (date unknown).

Commonly owned, co–pending application Ser. No. 08/836, 886, entitled "Monitor Matrix for Audio Mixer" filed Mar. 25, 1993.

*Primary Examiner*—Forester W. Isen

*Attorney, Agent, or Firm*—Ronald P. Kananen

[57] ABSTRACT

A audio mixer is disclosed in which selection of audio monitor signals is accomplished by an edit select switch and a plurality of monitor select switches on a monitor select portion of the mixer display. When the edit select switch is enabled, selection of audio monitor source signals is controlled by an editor. When the edit select switch is not enabled, audio monitor signals may be selected by the plurality of monitor select switches. Selection of audio monitor signals is achieved regardless of whether or not the mixer is under general crossfade control by an editor.

12 Claims, 12 Drawing Sheets

*FIG. 4*

| | IF YOU PRESS THE SWITCH: | MONITOR SIGNALS WILL BE FED FROM: |
|---|---|---|
| 151 | LINE 1-2 | LINE OUT 1 AND 2 |
| 152 | LINE 3-4 | LINE OUT 3 AND 4 |
| 153 | EXT 1-2 | EXT IN 1 AND 2 |
| 154 | EXT 3-4 | EXT IN 3 AND 4 |
| 155 | RET 1-2 | RETURN 1 AND 2 |
| 156 | RET 3-4 | RETURN 3 AND 4 |
| 157 | SEND 1 | SEND OUT 1 |
| 158 | SEND 2 | SEND OUT 2 |
| 159 | SEND 3 | SEND OUT 3 |
| 160 | SEND 4 | SEND OUT 4 |

FIG. 5

| | WHEN YOU PRESS EITHER: 130 | THE SIGNALS ROUTED TO THE INPUT OF THE MONITOR MATRIX ARE: MONITOR SOURCE 1 | MONITOR SOURCE 2 | MONITOR SOURCE 3 | MONITOR SOURCE 4 |
|---|---|---|---|---|---|
| | WHEN THE □2CH/▭4CH IS SET TO □ 2CH (RELEASED) POSITION. | | | | |
| 151 | LINE 1-2 | LINE 1 | LINE 2 | OFF | OFF |
| 152 | LINE 3-4 | LINE 3 | LINE 4 | OFF | OFF |
| 153 | EXT 1-2 | EXT 1 | EXT 2 | OFF | OFF |
| 154 | EXT 3-4 | EXT 3 | EXT 4 | OFF | OFF |
| 155 | RTN 1-2 | RTN 1 | RTN 2 | OFF | OFF |
| 156 | RTN 3-4 | RTN 3 | RTN 4 | OFF | OFF |
| 112 | EDIT | EDIT 1 | EDIT 2 | OFF | OFF |
| | WHEN THE □2CH/▭4CH IS SET TO ▭ 4CH (DEPRESSED) POSITION. | | | | |
| 151 | LINE 1-2 | LINE 1 | LINE 2 | LINE 3 | LINE 4 |
| 152 | LINE 3-4 | LINE 1 | LINE 2 | LINE 3 | LINE 4 |
| 153 | EXT 1-2 | EXT 1 | EXT 2 | EXT 3 | EXT 4 |
| 154 | EXT 3-4 | EXT 1 | EXT 2 | EXT 3 | EXT 4 |
| 155 | RTN 1-2 | RTN 1 | RTN 2 | RTN 3 | RTN 4 |
| 156 | RTN 3-4 | RTN 1 | RTN 2 | RTN 3 | RTN 4 |
| 112 | EDIT | EDIT 1 | EDIT 2 | EDIT 3 | EDIT 4 |
| | SEND SWITCHES ARE INDEPENDENT OF THE SETTING OF THE □2CH/▭4CH SWITCH. | | | | |
| 157 | SEND 1 | SEND 1 | SEND 1 | OFF | OFF |
| 158 | SEND 2 | SEND 2 | SEND 2 | OFF | OFF |
| 159 | SEND 3 | SEND 3 | SEND 3 | OFF | OFF |
| 160 | SEND 4 | SEND 4 | SEND 4 | OFF | OFF |
| | BOTH SEND 1 AND SEND 2 SIMULTANEOUSLY | SEND 1 | SEND 2 | OFF | OFF |
| | BOTH SEND 3 AND SEND 4 SIMULTANEOUSLY | SEND 3 | SEND 4 | OFF | OFF |
| | WHEN THE PFL SWITCH ON AN INPUT CHANNEL IS DEPRESSED. | | | | |
| 140 | PFL | PFL SIGNAL | PFL SIGNAL | OFF | OFF |

EDIT SELECT SWITCH FOR MONITOR SOURCE SELECT

FIELD OF THE INVENTION

This invention relates to a method and apparatus for selecting audio monitor signals in an audio follow mixer. More particularly, this invention relates to an improved method of selecting monitor output signals from a variety of audio signals in an audio follow mixer and an implementing circuit therefor.

BACKGROUND OF THE INVENTION

An audio follow mixer may be used in a variety of ways in order to process a plurality of audio signals. In most applications, it is useful to monitor the audio signals which are being processed by routing selected audio signals in the mixer to one or more monitor output terminals located on the mixer. These terminals may then provide one or more audio channels to one or more monitor devices, such as speakers.

In a typical application, the mixer is used for audio editing in conjunction with an editor and a plurality of other devices, such as VTRs, which provide input signals to the mixer as well as receive output signals from the mixer. In such a system, the editor controls the mixer to process various audio signals in the mixer. That is, various input signals may be mixed and then output from the mixer according to control signals supplied to the mixer by the editor.

In order to facilitate this operation, many mixers provide an "editor mode" selector which places all functions of the mixer under control of the editor, including the selection of monitor output signals. Thus, the editor may be used to select various monitor output signals, as well as to control the output to other devices such as VTRs used for recording.

One drawback of these prior art mixer systems is that if the user wishes to control the selection of monitor output signals with an editor, the entire mixer must be placed under crossfade control by the editor. Thus, while under crossfade control, the other functions of the mixer cannot be controlled in other ways, for example, through a control panel on the mixer itself. Instead, these other functions must be controlled indirectly through the editor.

Another related drawback of these mixer systems is that when the mixer is placed under crossfade control by the editor, no monitor output signal may be selected directly using the mixer itself. Therefore, only those monitor output signals selected with the editor are available for monitoring.

Consequently, there is a need to provide a more flexible way of enabling the selection of monitor audio signals independent of crossfade control of a mixer by an editor.

SUMMARY OF THE INVENTION

A general object of this invention is to provide a simple, more flexible way of facilitating the use of an editor for the selection of monitor output signals in an audio mixer system.

This and other objects and advantages are achieved in this invention by the use of an edit select switch located directly on the mixer display, and associated switching control circuiting.

For example, according to an embodiment of the present invention, an audio mixer is coupled to at least one input device providing a plurality of input audio signals to the mixer, and further coupled to an editor providing a plurality of control signals to the mixer. The audio mixer includes edit select switching means located on a monitor select portion of the mixer for enabling the control of the selection of one or more monitor audio signals from the input audio signals according to monitor selection control signals supplied from the editor, whereby at least one monitor audio signal may be routed to one or more monitor source terminals on the mixer. There is further provided signal select switching means for selecting one or more monitor audio signals from said input audio signals, whereby at least one monitor audio signal may be routed to said one or more monitor source terminals when said edit select switching means is not enabled. The signal select switching means selects said one or more monitor audio signal regardless of editor control of non-monitor select functions performed by the mixer.

Another embodiment of the invention further includes a light emitting indicator means for indicating when the edit select switching means is enabled. Moreover, in this embodiment, the signal select switching means includes a plurality of light emitting indicators coupled to a corresponding plurality of switches which control the routing of the input audio signals to one or more monitor source terminals when the edit select switching means is not enabled.

In another embodiment, the mixer is coupled to a plurality of output devices for receiving output audio signals processed by the mixer whereby an editor controls video editing of input signals.

According to another embodiment of the invention, there is disclosed a method of selecting monitor audio signals in an audio mixer coupled to at least one input device providing a plurality of input audio signals to the mixer, and further coupled to an editor providing a plurality of control signals to the mixer. This method comprises the steps of: enabling a control of the selection of one or more monitor audio signals from the input audio signals with an edit select switch located on a monitor select portion of the mixer according to monitor selection control signals supplied from the editor, whereby at least one monitor audio signal may be routed to one or more monitor source terminals on the mixer; and selecting one or more monitor audio signals from the input audio signals with a plurality of signal select switches, whereby at least one monitor audio signal may be routed to one or more monitor source terminals when the edit select switch is not enabled. Thus, the plurality of signal select switches selects one or more monitor audio signal regardless of editor control of non-monitor select functions performed by the mixer.

Upon study of the specification and appended claims, further advantages of this invention will become apparent to those skilled in the art.

BRIEF DESCRIPTION OF THE DRAWINGS

FIG. 4 is a table which indicates the result of closing the switches shown in FIG. 3.

FIG. 5 is a table which indicates how various signals in the mixer described with reference to FIG. 3 will be routed.

DETAILED DESCRIPTION OF THE INVENTION

Figure 1:
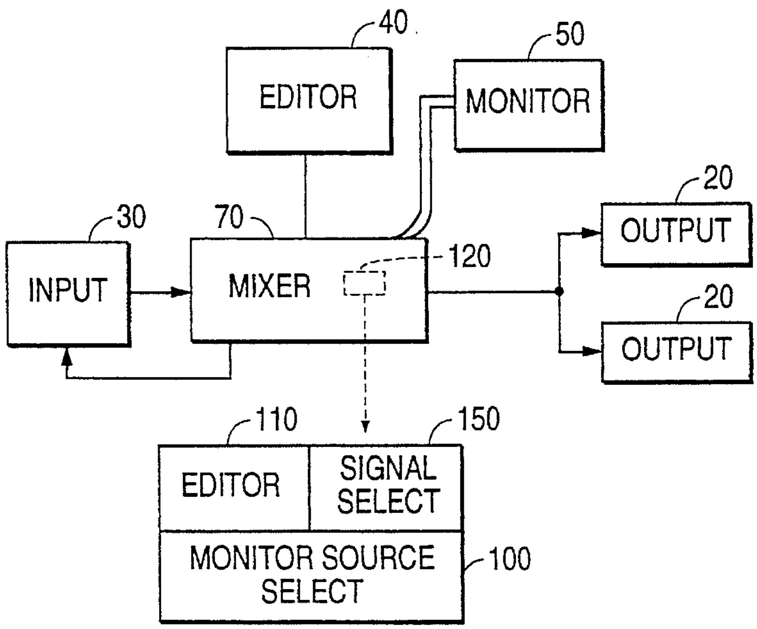
FIG. 1 is an illustration in a block diagram format of a video mixer system incorporating the invention.

FIG. 1 illustrates an example of a mixer system incorporating the present invention. A mixer 70 is coupled to one or more input devices represented generally by an input block 30. The mixer 70 is further coupled to various output devices 20, an editor 40, and at least one audio monitor device represented by a monitor block 50. Through this arrangement, input devices 30 provide various audio signals to the mixer 70 so that the audio signals may be processed under the control of the editor 40. Processed audio signals are output from the mixer 70 to a plurality of output devices 20. One or more of the various audio signals in the mixer may be monitored by the audio monitor 50 connected to the mixer 70. In order to accomplish this monitoring, the various audio signals in the mixer 70 may be selected by setting the switches located on the monitor source select panel 100, which is subdivided into an editor select portion 110 and a signal select portion 150. Accordingly, by enabling an editor select switch (not shown) located on the editor select portion 110 of the monitor source select panel 100, the user may set the monitor source signals to be selected in the mixer 70 under the control of the editor 40. However, if the editor select switch 120 is not enabled, the monitor source signals to be output to the audio monitor device 50 are selected according to the settings of the signal select switches on the select portion 150, regardless of whether other signal processing functions of the mixer 70 are under the control of the editor 40.

Figure 2:
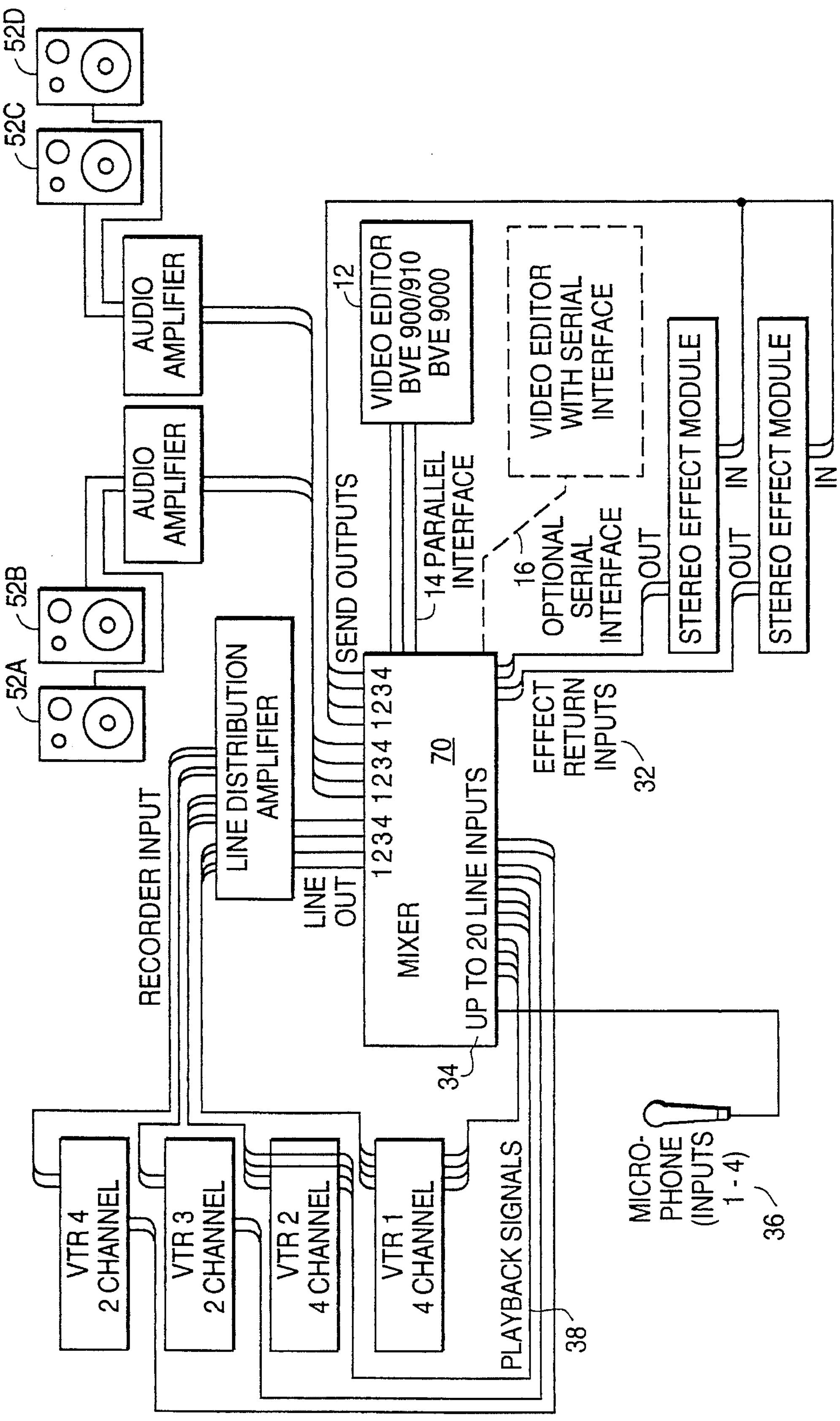
FIG. 2 is a diagram of a typical application of the invention.

FIG. 2 illustrates a specific arrangement of a mixer system well-suited for incorporating the invention. In this arrangement, the mixer 70 may be controlled by a video editor 12 in order to edit various audio input signals. Some of the input audio signals might include effect return inputs 32 as well as various line inputs 34, for example microphone inputs 36 or VTR playback inputs 38. These signals may be processed by the mixer 70 under the control of the video editor 12 through a parallel interface 14 and a serial interface 16.

Audio editing is performed by this mixer system by placing the mixer 70 under the control of the video editor 12. Typically, this is achieved by setting the mixer 70 to an "editor mode" in which various mixer functions such as control of VTR PREVIEW/REVIEW or FADEUP/DOWN are under the control of the editor 12. Specifically, the mixer is placed under crossfade control, and control signals are sent from the video editor 12 through the interfaces 14 and 16. While the editing process is carried out, some of the various audio signals processed by the mixer 70 may be monitored through attached monitoring devices, such as the four speakers 52A, 52B, 52C and 52D arranged as shown in FIG. 2. According to this arrangement, four audio channels are selected and then output to the two speaker pairs.

In the example shown in FIG. 2, it may at times be desired to control some of the processing functions of the mixer 70 independently of the video editor 12, while at the same time using the video editor 12 to control the selection of the monitor output signals monitored by speakers 52A to 52D connected to the mixer. Conversely, it may be convenient to select the monitor source signals directly with the mixer 70 while leaving the other processing functions of the mixer 70 under control of the editor 12. These needs are achieved through use of an editor select switch described more particularly herein.

Figure 3:
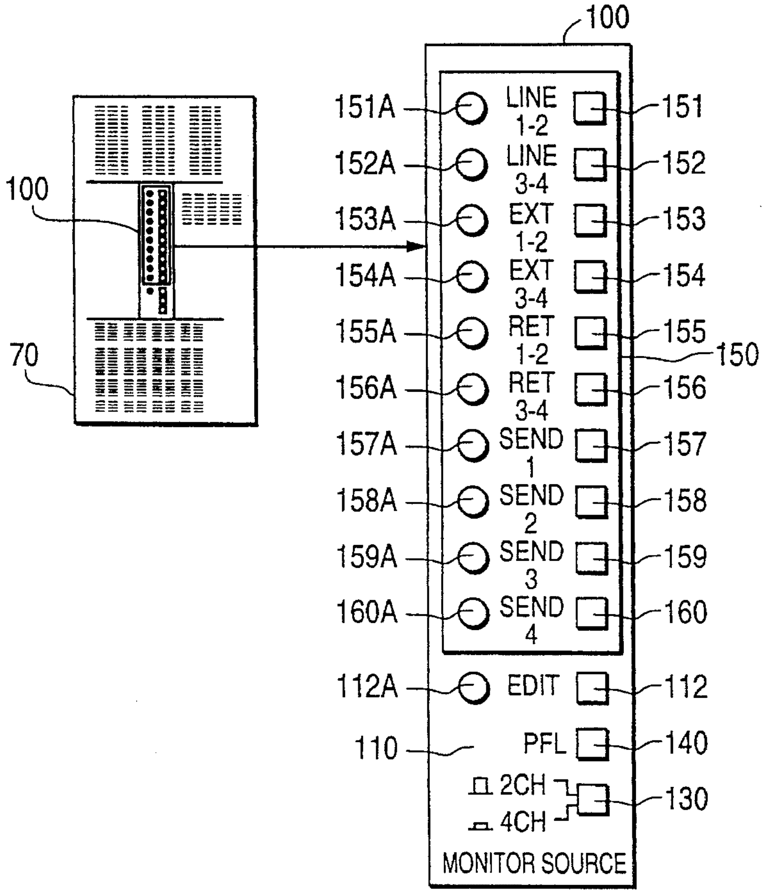
FIG. 3 is an example of one embodiment of the invention.

FIG. 3 shows an embodiment of the invention in which an edit select switch 112 located on the mixer 70 is used to enable or disable monitor signal selection by an editor (not shown). A monitor select panel 100 is located on the mixer 70. The select panel is subdivided into an editor select portion 110 and a signal select portion 150. The control of monitor source selection may be provided to an editor by enabling the edit select switch 112. When the edit select switch 112 is closed, the selection of monitor source signals provided to monitor output terminals on the mixer is controlled by the editor. At such a time, editor control of monitor source selection is indicated by an LED 112A.

Conversely, monitor source signals may be selected directly on the mixer 70 by depressing the appropriate monitor select switches 151 to 160 when the edit select switch 112 is not enabled. Accordingly, when any of these switches 151 to 160 are closed, the corresponding audio signal will be supplied to monitor source output terminals in the mixer regardless of whether other non-monitor functions of the mixer are controlled by an editor. Furthermore, when any monitor select switch 151, 152, 153, 154, 155, 156, 157, 158, 159, or 160 is closed, a corresponding LED 151A, 152A, 153A, 154A, 155A, 156A, 157A, 158A, 159A, or 160A indicates that the monitor select switch is enabled, and therefore the corresponding audio signal is being provided to the monitor output terminals on the mixer.

FIG. 4 indicates the audio signals which may correspond to the switches 151 to 160. For example, when the switch 151 is closed, the audio signals from LINE OUT 1 and LINE OUT 2 will be supplied to the monitor output terminals located on the mixer 70. While the example shown shows a ten switch arrangement, any number of switches coupling a plurality of audio signals may be used.

The example shown in FIG. 3 also includes a channel number switch 130 for determining the number of output channels available to be provided to monitor output terminals on the mixer. While the number of output monitor channels may vary, in the embodiment shown, up to four channels may be monitored. According to this arrangement, when channel number switch 130 is open, two monitor source signals may be available for monitoring by external monitoring devices. When the channel number switch 130 is closed, four monitor output signals may be available to be monitored by external monitoring devices. Preferably, the channel number switch switches between two channels and four channels.

Also illustrated is a pre-fader listen (PFL) switch 140. When this switch is closed, a PFL signal may be supplied to one or more of the monitor output terminals.

FIG. 5 indicates more specifically which audio signals are available to be routed to any of four monitor output terminals on the mixer 100 depending on the status of the monitor output switches 151 to 160, the channel number switch 130, and PFL switch 140. In this particular example, the SEND switches 157, 158, 159, and 160 are coupled to the monitor output terminals such that the SEND 1, SEND 2, SEND 3, and SEND 4 signals are routed independently of the condition of the channel number switch 130.

Figure 6A:
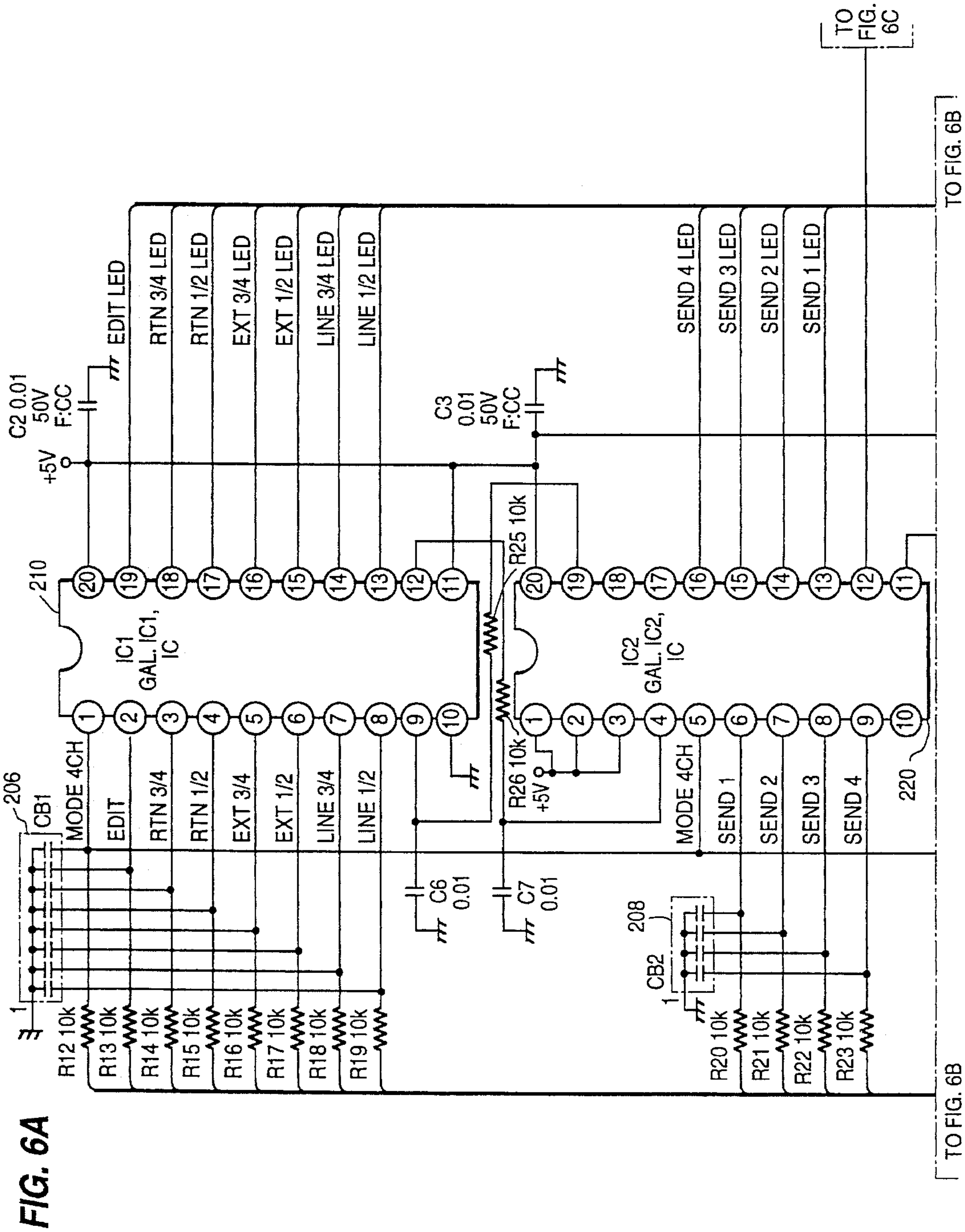
FIG. 6 (consisting of sectioned FIGS. 6A to 6C) is a circuit diagram describing one example which may be used to implement the embodiment shown by FIGS. 3 to 5.
Figure 6B:
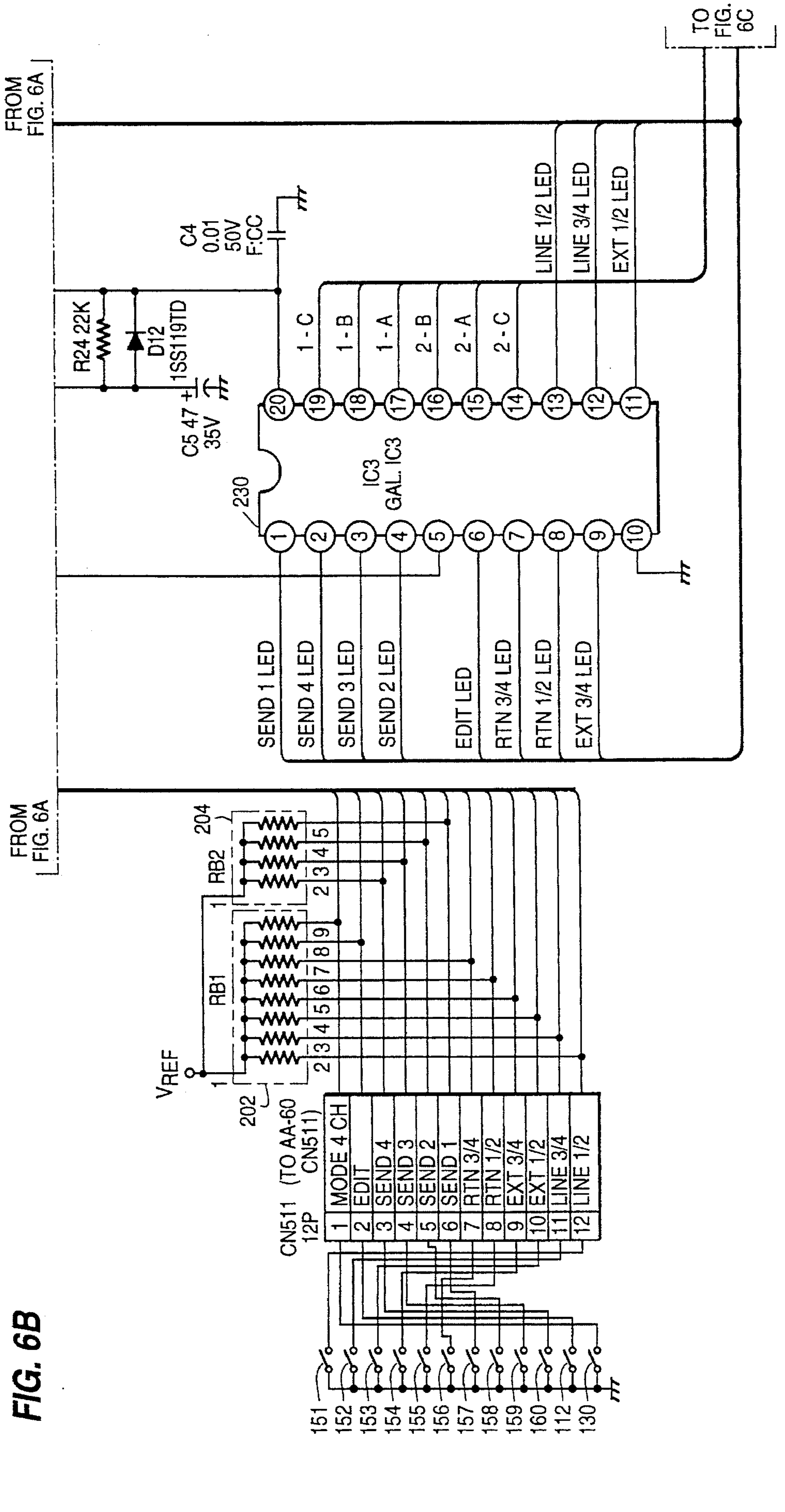
Figure 6C:
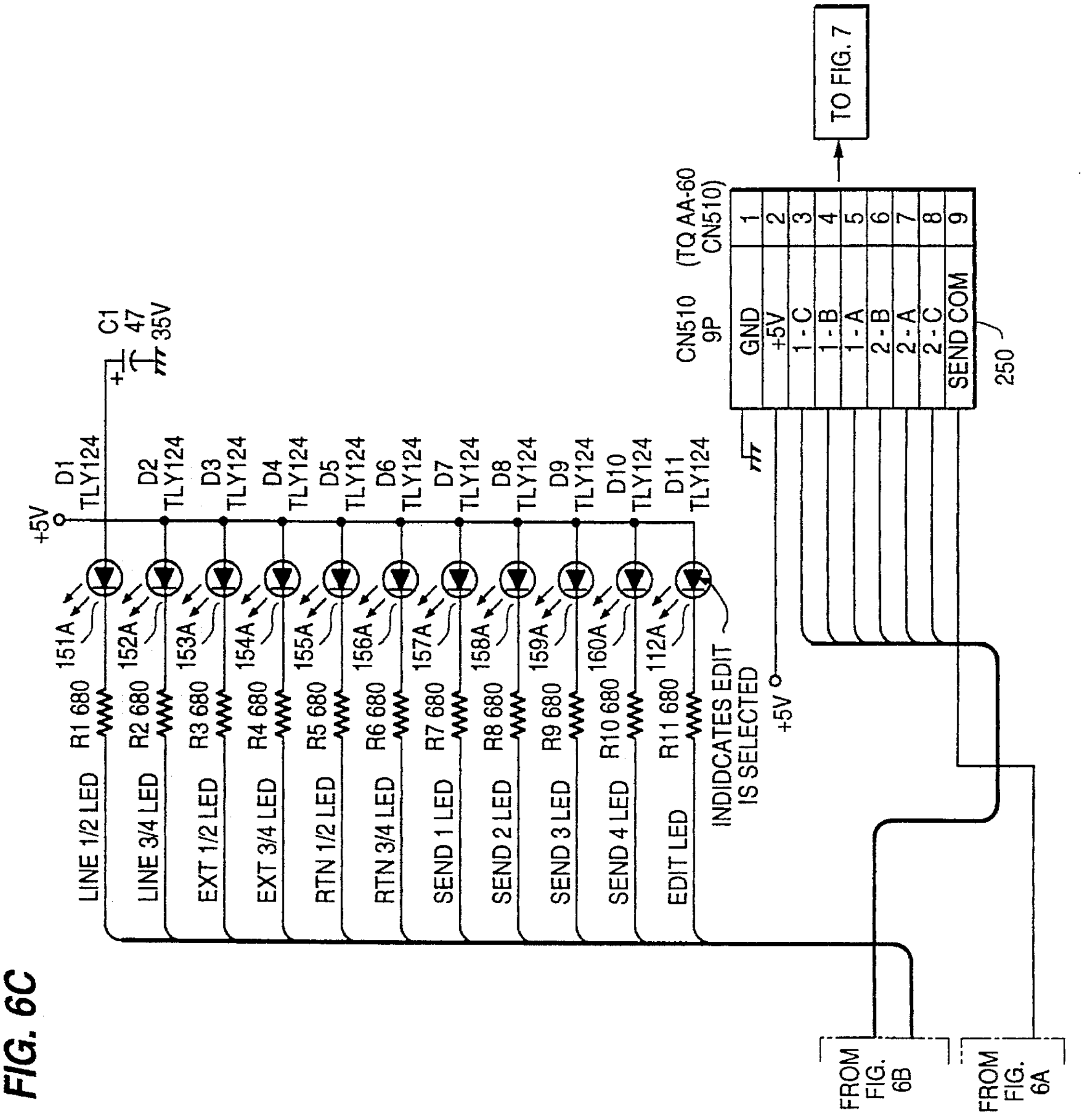
Figure 7A:
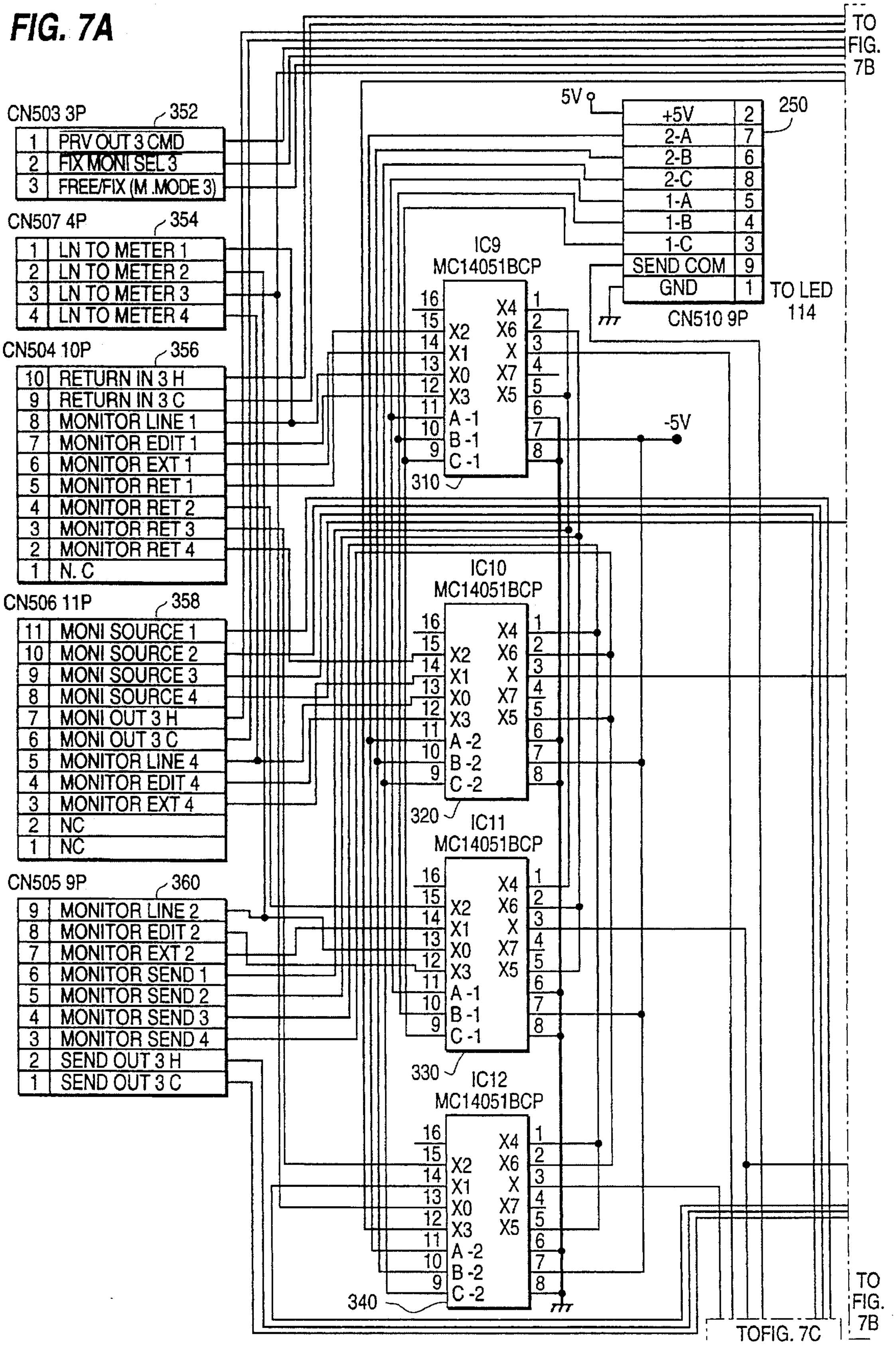
FIGS. 7A to 7D is a continuation of the circuit diagram of FIG. 6.
Figure 7B:
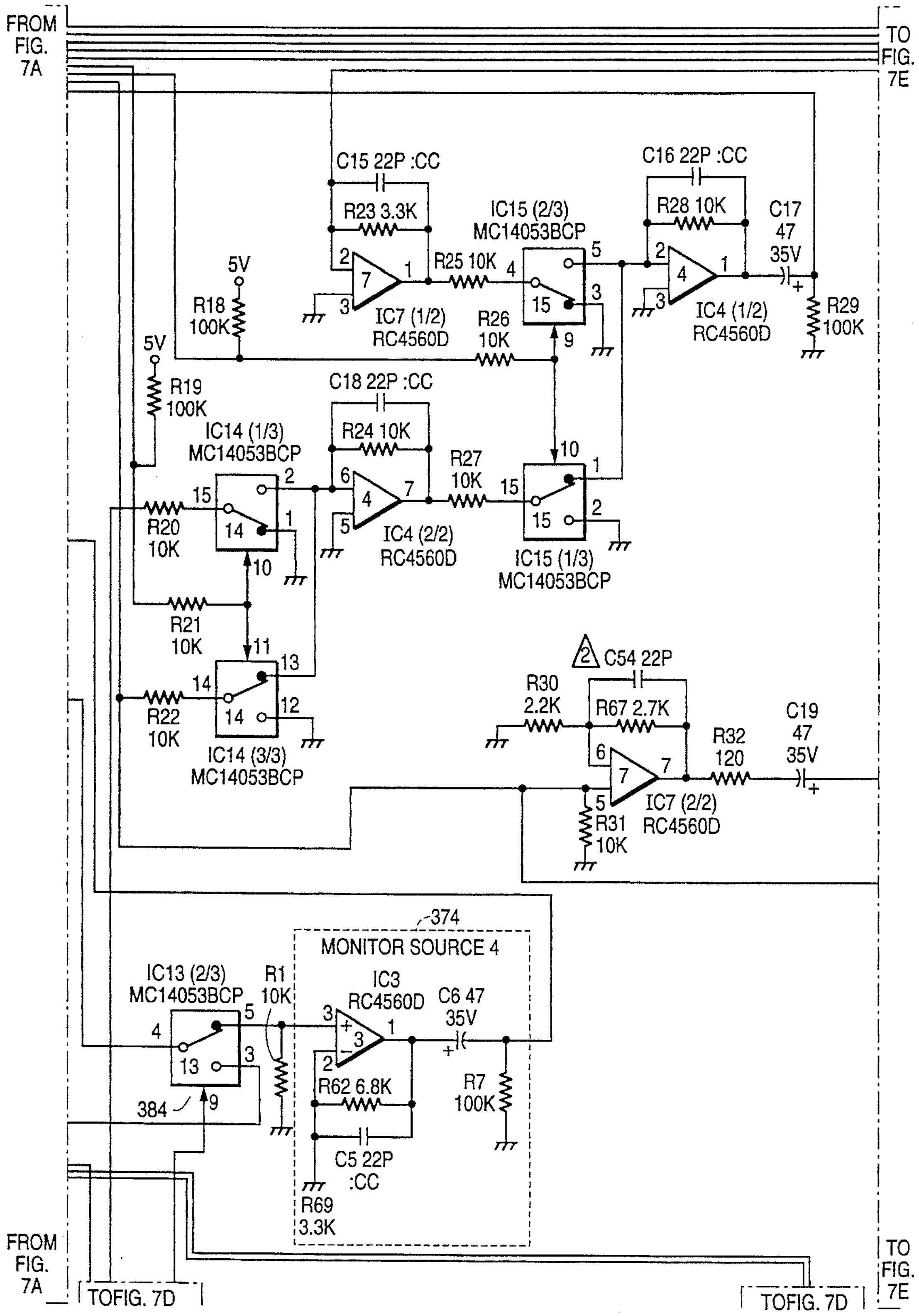
Figure 7C:
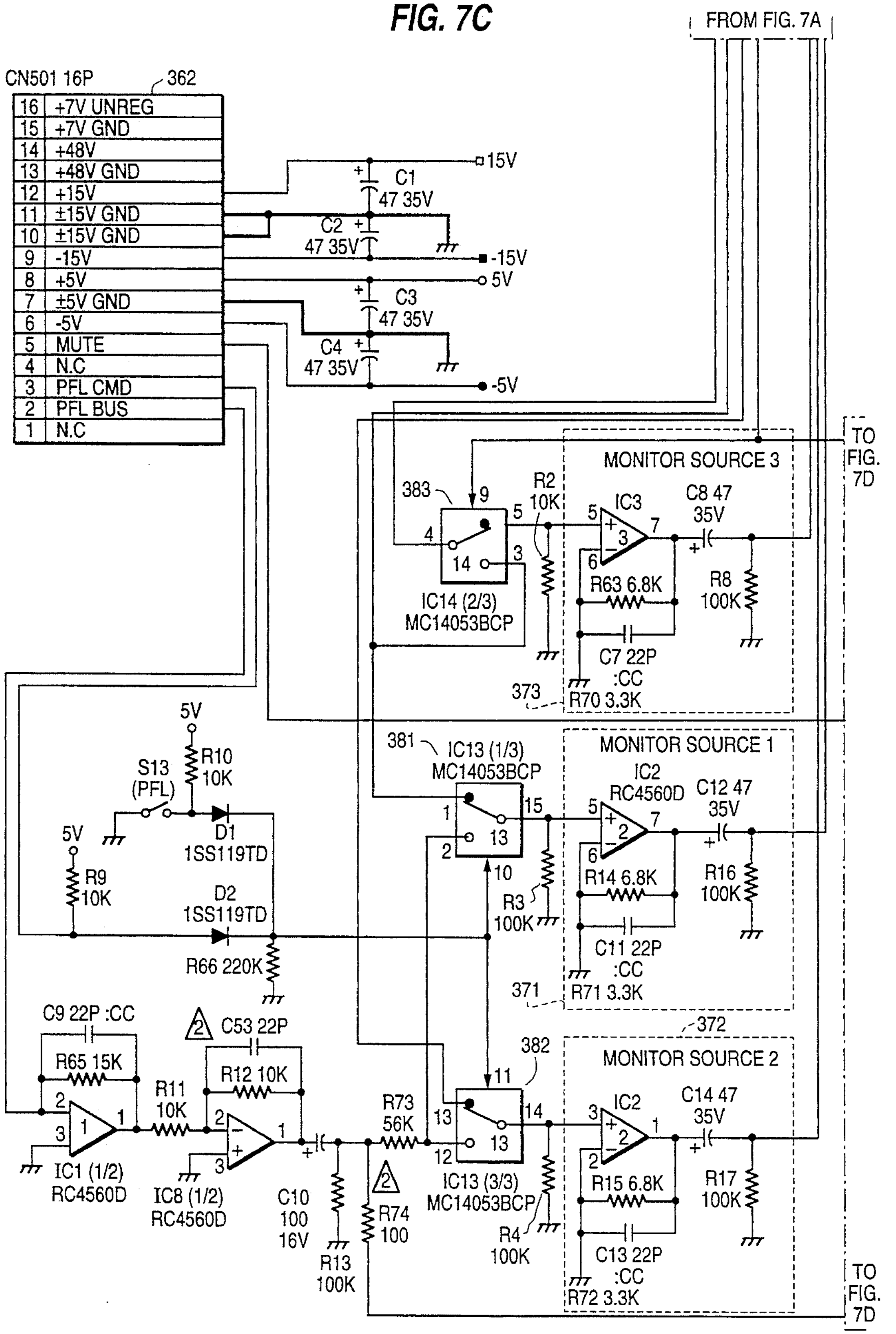
Figure 7D:
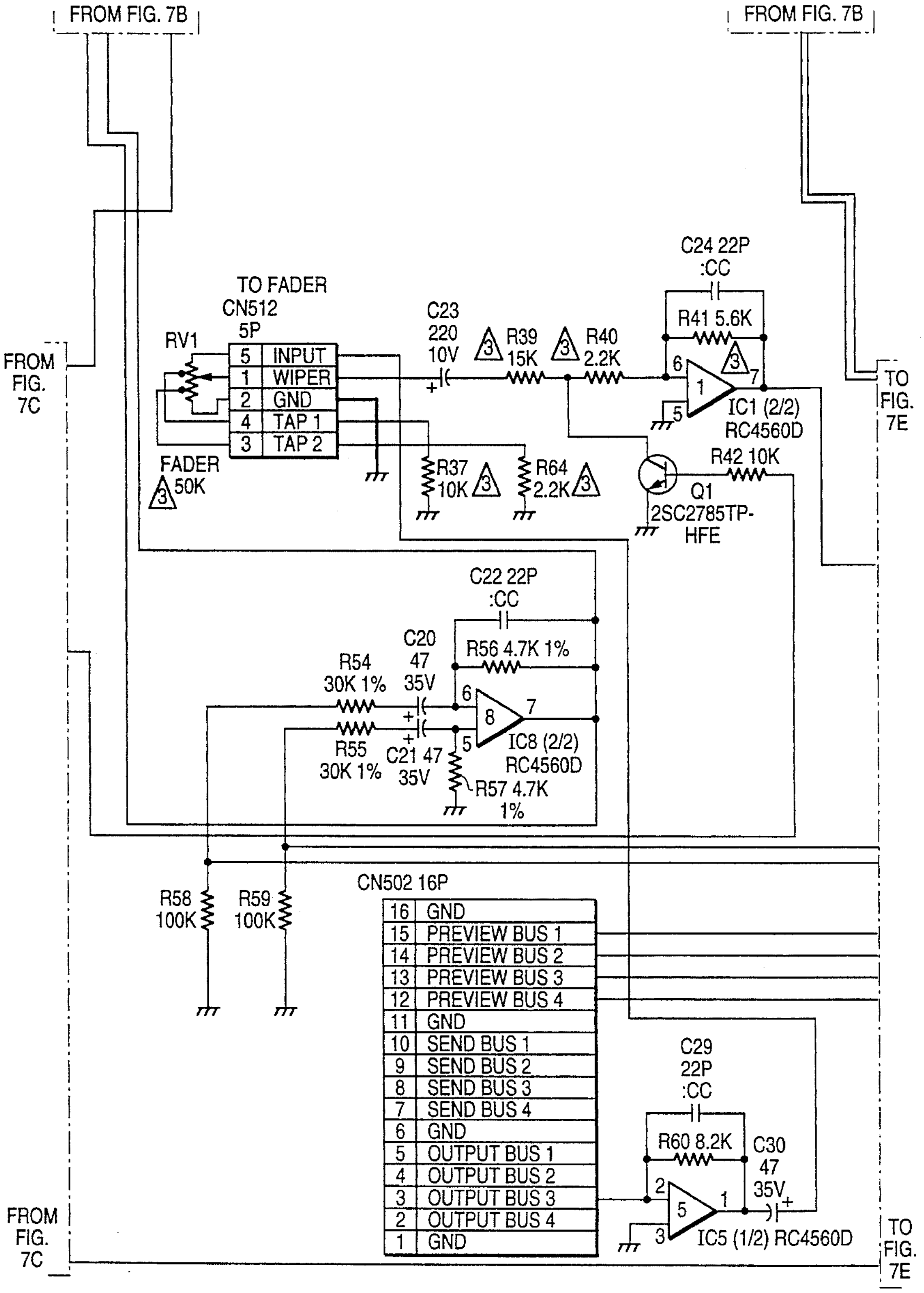
Figure 7E:
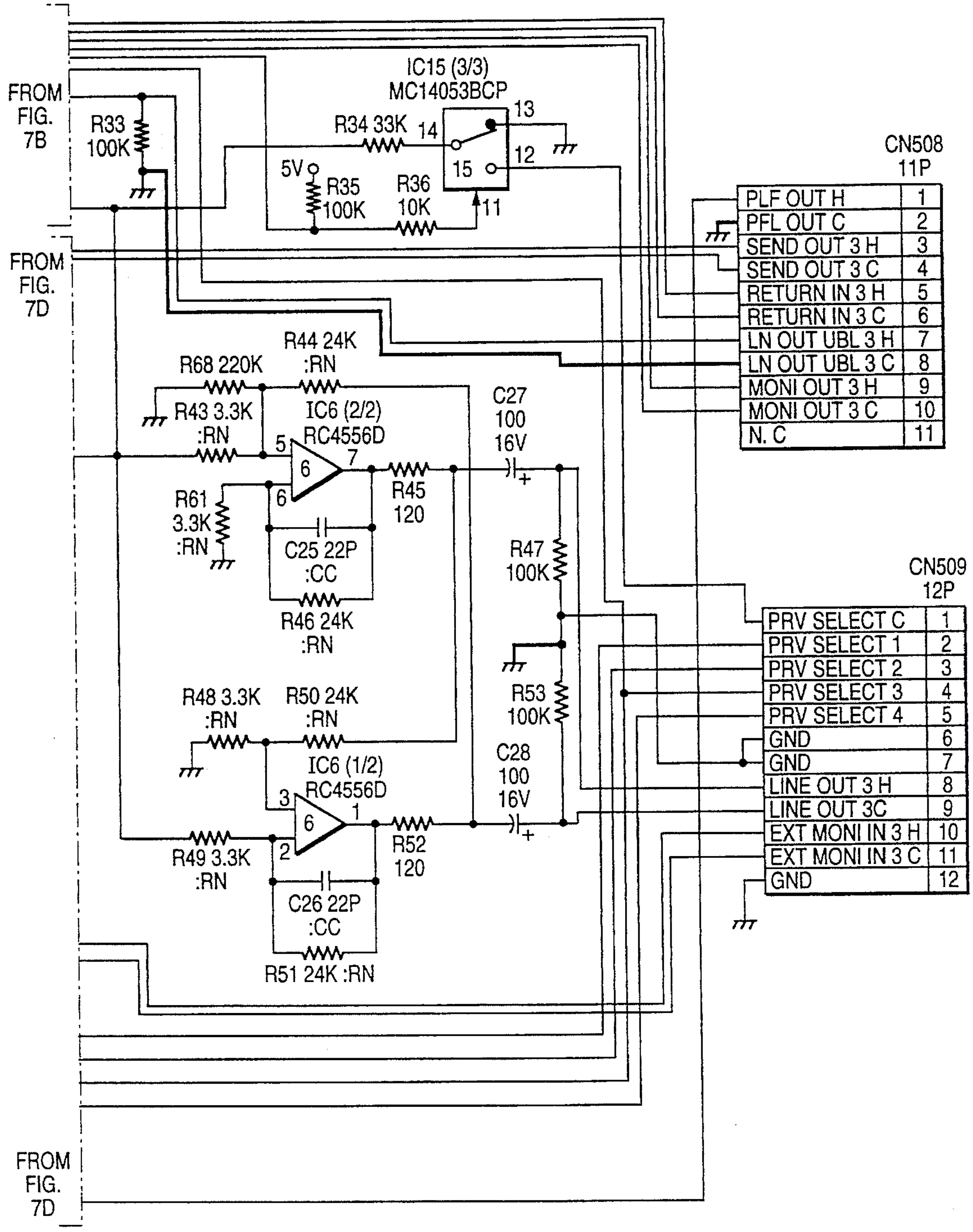
FIG. 7 (consisting of sectioned

FIGS. 6 and 7 provide an example of a particular circuit arrangement which may be used to implement the embodiment of the invention described with reference to FIG. 5. However, it should be appreciated that the embodiments described above may be implemented in any of a number of ways well known in the art. Further, because the diagrams of FIG. 6 and FIG. 7 provide a detailed schematic of all elements included in this particular example, the description below is limited to those elements particularly related to the invention.

FIG. 6 shows the plurality of monitor select switches 151 to 160, an edit select switch 112, and a channel number switch 130 arranged substantially as shown in FIG. 3 (the PFL switch 140 is omitted). These twelve switches are coupled between a ground point and a series of corresponding resistors (contained in integrated circuits 202 and 204) further coupled to a reference voltage $V_{REF}$ as shown. The switches are further coupled to ground through twelve corresponding capacitors contained in integrated circuits 206 and 208.

Accordingly, when any of these switches are closed, corresponding logic signals are provided to the inputs of integrated circuits 210, 220, and 230. More particularly, if the edit select switch 112 is closed, an indicative logic signal is supplied to pin 2 of the integrated circuit 210. If the edit select switch 112 is open, an opposite logic signal is supplied to the integrated circuit 210.

As FIG. 6 makes clear, if any of the switches on the panel 100 except the channel number switch 130 is closed, the integrated circuits 210 and 220 will drive the corresponding LED indicators 112A, 151A, 152A, 153A, 154A, 155A, 156A, 157A, 158A, 159A, or 160A, thereby indicating that the selected switch is closed. Furthermore, when any of the twelve switches 112, 130, or 151 to 160 are closed, the integrated circuits 210 and 220 will provide corresponding logic signals to pins 6, 5, 13, 12, 11, 9, 8, 7, 1, 2, 3, and 4, respectively, of the integrated circuit 230.

The integrated circuit 250 provides six logic output signals 1-A, 1-B, 1-C, 2-A, 2-B, and 2-C dependent upon the logic state of these inputs to a terminal juncture block 250. The logic signals 1-A, 1-B, 1-C, 2-A, 2-B, and 2-C are provided to the programmable logic devices (PLDs) 310, 320, 330, and 340 shown in FIG. 7.

As FIG. 7 indicates, each of the PLDs 310, 320, 330, and 340 couple various audio input signals to four monitor source channels one through four which are provided respectively by the block circuits 371, 372, 373 and 374. For example, the monitor line 1 signal (LINE OUT 1) is connected from pin 8 of the juncture block 356 to pin 13 of the PLD 310; thus, the LINE OUT 1 signal is coupled to the switch 152 through the juncture point 250 and through the circuit shown in FIG. 6. Each of the circuits 371, 372, 373, and 374 may then provide a monitor output signal to the monitor terminals located respectively at pins 11, 10, 9, and 8 at the juncture block 358.

An output of each PLD 310, 320, 330, and 340 is provided from pin 3 of each PLD 300, 325, 350, and 375 to the monitor source channel output circuits 371, 372, 373, and 374 according to the logic signals 1-A, 1-B, 1-C, or the logic signals 2-A, 2-B, 2-C. The output from the PLDs 310, 320, 330, and 340 is routed according to the state of analog switches 383 and 384, which are in turn operated according to the control of a SEND COM signal supplied from integrated circuit 220 (as shown in FIG. 6) via pin 9 of the juncture 250.

Further, the analog switches 381 and 382 are coupled to a separate pre-fader listener (PFL) logic signal shown at pin 3 of the juncture 362. Depending on the state of the switch 140 (FIG. 3), this control signal may route an audio signal from a PFL bus shown at pin 2 of the juncture 362 to monitor outputs one and two through the circuits 371 and 372.

As shown in FIG. 7, when the edit control select switch 112 is open, the appropriate logic signals 1-A, 1-B, 1-C, 2-A, 2-B, and 2-C will be supplied from the integrated circuit 230 to the PLDs 310, 320, 330 and 340 indicating that the edit control switch 112 is open, and further indicating which monitor select switches 151160 160 are closed. Depending on the logic signals received by the PLDs 310, 320, 330, and 340, the audio signals corresponding to the selected switches 151–160 will be routed to the monitor source output at the juncture 358 via pin 3 of the PLDs 310, 320, 330, and 340 as indicated by FIG. 4 and FIG. 5.

However, if the control signals 1-A, 1-B, 1-C, 2-A, 2-B, and 2-C indicate that the edit select switch 112 is closed, the routing of the various audio signals from junctures 356, 358, and 360 will be controlled by an attached video editor 12 as shown in FIG. 2. The video editor thus controls the selection of the monitor source output signals.

Once control of monitor source selection is placed under the control of the editor 12, editor control may be implemented in a variety of ways well known in the art. FIG. 7 discloses one embodiment in which the audio signals from the junctures 356, 358, and 360 are routed according to the control signals provided from the MONITOR EDIT terminals to pin 12 of each of the PLDs 310, 320, 330 and 340. According to this embodiment, if the edit select switch 112 is enabled, an editor will control the monitor source selection irrespective of the settings of the monitor source select switches 151-160.

From the foregoing description, one skilled in the art can easily ascertain the essential characteristics of this invention, and without departing from the spirit and scope thereof, can make various changes and modifications of the invention to adapt it to various usages and conditions.

We claim:

1. An audio mixer coupled to at least one input device providing a plurality of input audio signals to the mixer, and further coupled to an editor providing a plurality of control signals to the mixer, the audio mixer comprising:

edit select switching means located on a monitor select portion of the mixer for enabling the control of the selection of one or more monitor audio signals from said input audio signals according to monitor selection control signals supplied from the editor, whereby at least one monitor audio signal is routed to one or more monitor source terminals on the mixer; and signal select switching means for selecting one or more monitor audio signals from said input audio signals, whereby at least one monitor audio signal is routed to said one or more monitor source terminals when said edit select switching means is not enabled;

wherein said signal select switching means selects said one or more monitor audio signal regardless of editor control of non-monitor select functions performed by the mixer; and wherein said edit select switching means includes an analog edit select switch and said signal select switching means includes a plurality of analog switches, and the audio mixer further comprises:

circuit means for detecting the respective positions of said edit select switch and said plurality of analog switches;

logic circuit means for selectively coupling said input audio signals to said one or more monitor source terminals; and the audio mixer further comprises circuit means coupled to said means for detecting for supplying to said logic circuit means a plurality of logic signals indicative of the detected positions of said edit select switch and said plurality of analog switches;

wherein said logic circuit means determines which of said input audio signals are coupled to said one or more monitor source terminals based on said plurality of logic signals.

2. The audio mixer of claim 1 further comprising a light emitting indicator means for indicating when said edit select switching means is enabled.

3. The audio mixer of claim 2 wherein said signal select switching means includes a plurality of light emitting indicators coupled to a corresponding plurality of switches which control the routing of said input audio signals to said one or more monitor source terminals when said edit select switching means is not enabled.

4. The audio mixer of claim 1 wherein said mixer is coupled to a plurality of output devices for receiving output audio signals processed by the mixer whereby the editor controls video editing of input signals.

5. A method of selecting monitor audio signals in an audio mixer coupled to at least one input device providing a plurality of input audio signals to the mixer, and further coupled to an editor providing a plurality of control signals to the mixer, comprising:

enabling the control of the selection of one or more monitor audio signals from said input audio signals with an edit select switch located on a monitor select portion of the mixer according to monitor selection control signals supplied from the editor, whereby at least one monitor audio signal is routed to one or more monitor source terminals on the mixer; and selecting one or more monitor audio signals from said input audio signals, with a plurality of signal select switches, whereby at least one monitor audio signal is routed to said one or more monitor source terminals when said edit select switching means is not enabled;

wherein said plurality of signal select switches selects said one or more monitor audio signal regardless of editor control of non-monitor select functions performed by the mixer;

wherein said method further includes the steps of: detecting the respective positions of said edit select switch and said plurality of analog switches; and supplying to a plurality of logic circuits means a plurality of logic signals indicative of the detected positions of said edit select switch and said plurality of analog switches; and selectively coupling said input audio signals to said one or more monitor source terminals with a plurality of logic circuits based on said plurality of logic signals.

6. The method of claim 5 further comprising indicating when said edit select switch is enabled with a light emitting indicator coupled to said edit select switch.

7. The method of claim 6 wherein said plurality of signal select switches are coupled to a corresponding plurality of light emitting indicators.

8. The method of claim 5 wherein said mixer is coupled to a plurality of output devices for receiving output audio signals processed by the mixer whereby the editor controls video editing of input signals.

9. The method of claim 5 wherein said plurality of logic circuits comprises one or more programmable logic devices.

10. An audio mixer apparatus for selecting monitor output channels in a mixer console, comprising:

a plurality of audio channels in the mixer console;

a plurality of source select switch members provided on a display portion of the mixer console, said source select members being operable to generate a first set of source select signals which indicate which of said plurality of audio channels are to be routed to at least one audio monitor output terminal provided in the mixer console;

an editor operatively coupled to said mixer console to provide control signals to control non-monitor processing of said audio channels and to provide a second set of source select signals which indicate which of said plurality of audio channels are to be routed to said at least one audio monitor output terminal provided in the mixer console;

an edit select switch member provided on said display portion of the mixer console, said edit select switch member being operable to generate a signal indicating that said audio channels are to be routed to said at least one audio monitor output terminal in accordance with said first set of source select signals or with said second set of source select signals; and logic circuit means to decode said first set of source select signals and said second set of source select signals and, depending on the signal provided from said edit select switch, control routing of selected audio channels to said at least one audio monitor output terminal on the basis of either said first set of source select signals or said second set of source select signals;

wherein the routing of selected audio channels is accomplished regardless of editor control of non-monitor processing of said audio channels in the mixer console.

11. The audio mixer apparatus of claim 10 wherein said logic means comprises one or more programmable logic devices.

12. The audio mixer apparatus of claim 10 wherein said source select switch members and said edit select switch member are operatively coupled to a corresponding number of light emitting diode which indicate the state of said source select switch members and said edit select switch member.

* * * * *